United States Patent [19]
Kirino et al.

[11] 3,959,114
[45] May 25, 1976

[54] APPARATUS FOR ARRANGING MATERIALS AT UNIFORM INTERVALS

[75] Inventors: Hisao Kirino, Funabashi; Kazumi Onda, Nagareyama, both of Japan

[73] Assignee: Nikkei Aluminium Company, Ltd., Tokyo, Japan

[22] Filed: Mar. 6, 1974

[21] Appl. No.: 448,756

[30] Foreign Application Priority Data
Mar. 6, 1973 Japan................................ 48-26827

[52] U.S. Cl........................... 204/297 W; 204/297 R
[51] Int. Cl.².......................................... C25D 17/08
[58] Field of Search.................... 204/297 R, 297 W

[56] References Cited
UNITED STATES PATENTS

| | | | |
|---|---|---|---|
| 1,970,459 | 8/1934 | Kelly............................. | 204/297 W |
| 3,118,545 | 1/1964 | Rosner.......................... | 204/297 W |
| 3,779,890 | 12/1973 | Witney et al.................. | 204/297 R |

*Primary Examiner*—F. C. Edmundson
*Attorney, Agent, or Firm*—Hill, Gross, Simpson, Van Santen, Steadman, Chiara & Simpson

[57] ABSTRACT

An apparatus for arranging materials at uniform intervals comprising a number of distance bars each consisting of a pair of bar units which are adapted to travel on guide rails and move toward and away from each other. The bar units are moved toward each other to widen each distance between a bar unit of a distance bar and a bar unit of an adjacent distance bar, so that materials or members to be treated can be inserted into the widened spaces between the bar units, after which the bar units are moved away from each other to ensure that the members are precisely arranged at determined intervals, in which position a platelike jig is struck into slots formed in the ends of the materials to maintain them, after which the bar units are again moved toward each other to widen the distance between the bar unit of one distance bar and the bar unit of the adjacent distance bar whereby enabling the members to be released from the distance bars permitting them to be fed to a treatment process station while being maintained at the uniform intervals.

17 Claims, 24 Drawing Figures

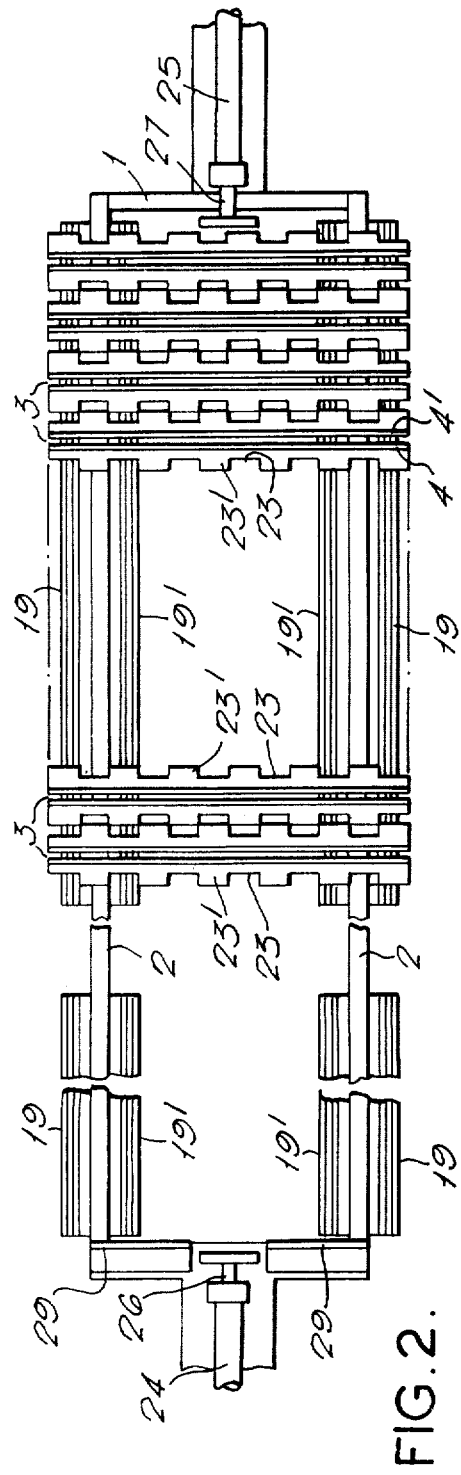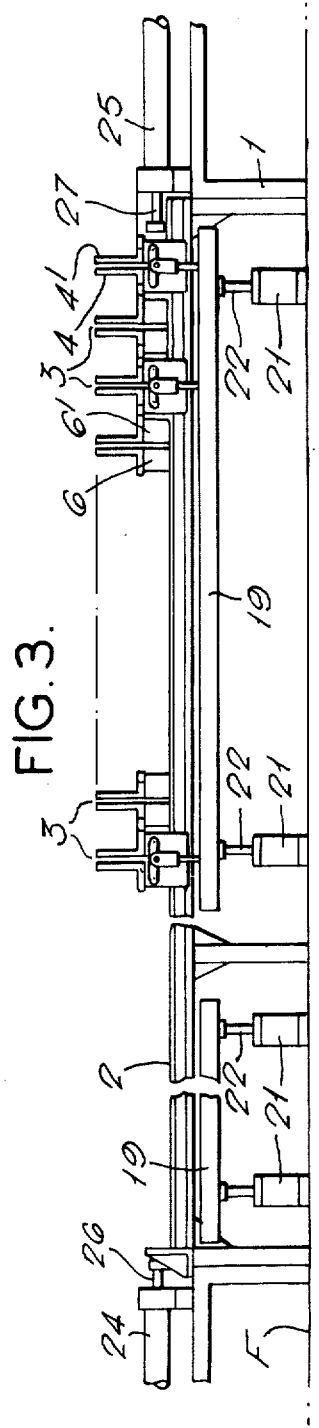
FIG. 2.
FIG. 3.

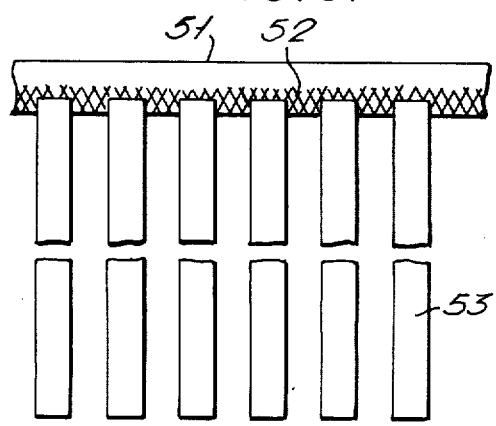
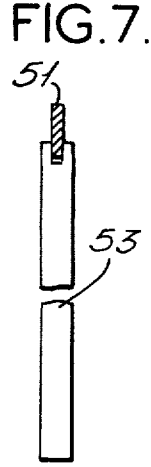
FIG. 6.   FIG. 7.
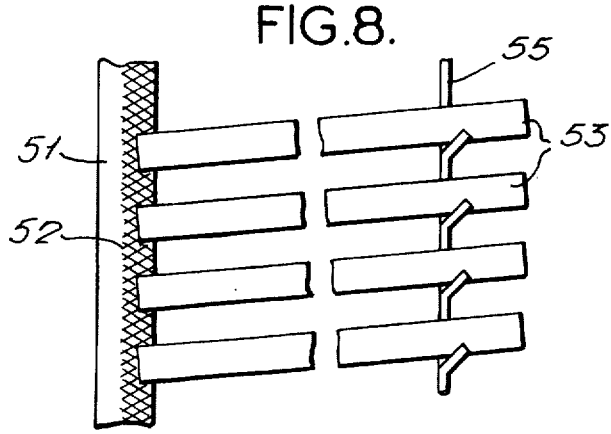
FIG. 8.
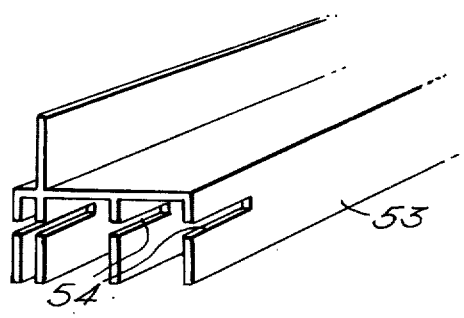
FIG. 9.

FIG. II.

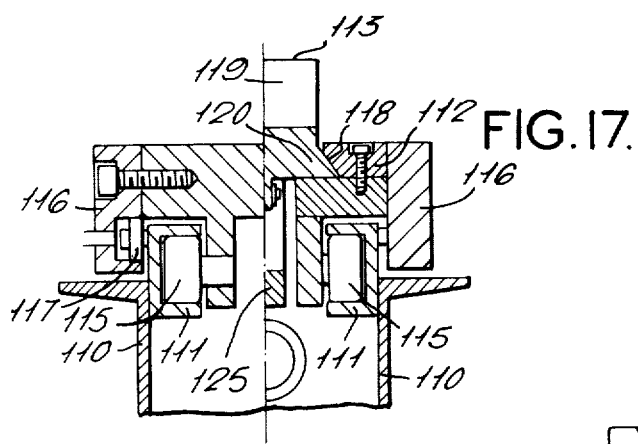
FIG. 17.
FIG. 18.
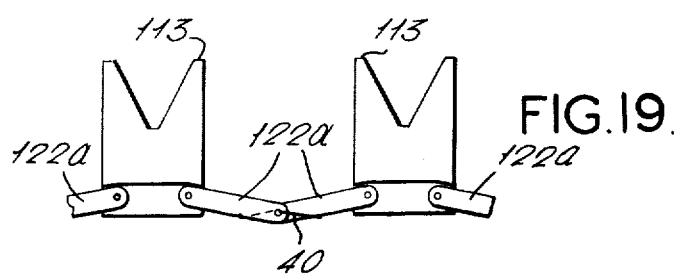
FIG. 19.
FIG. 20.

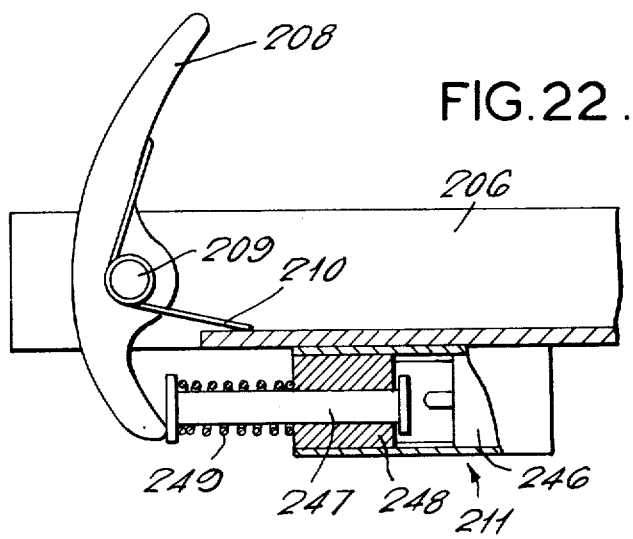
FIG.22.
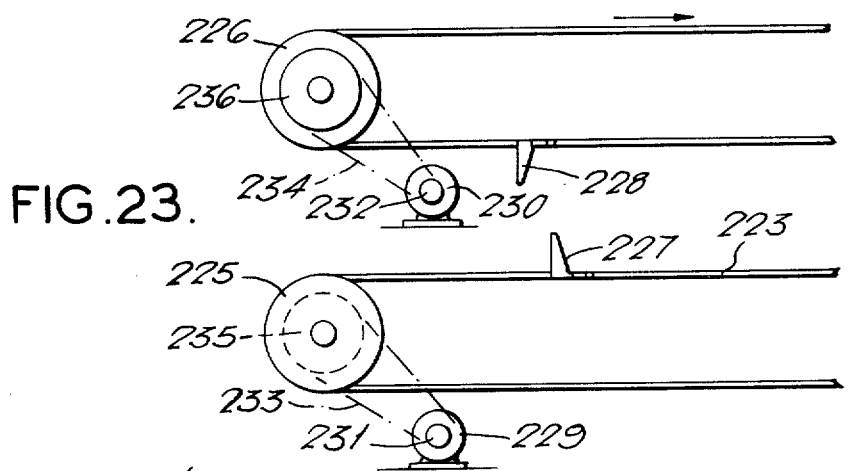
FIG.23.
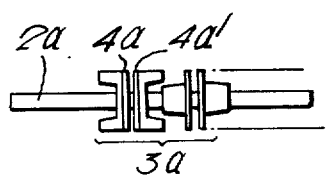
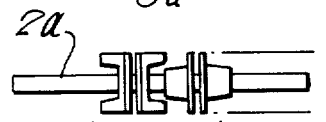
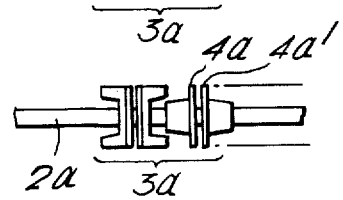
FIG.24.

APPARATUS FOR ARRANGING MATERIALS AT UNIFORM INTERVALS

BACKGROUND OF THE INVENTION

1. Field of the Invention

This invention relates to an apparatus for arranging at uniform intervals at a stock yard materials or members in the form of bars such as aluminum alloy frame members which are usually supplied irregularly or at unequal intervals to the stock yard for supplying them to surface treatment stations such as anodizing, coating, painting and the like.

2. Description of the Prior Art

In surface treatment of aluminum alloy frame bars or members such as anodizing and coating, it is required to arrange the members at uniform intervals in a surface treatment bath in order to obtain a uniform treatment effect. In prior art, however, a holding beam is provided with a number of fixtures such as bolts at an equal interval from which irregularly supplied members are hung by manual operation so that it is scarcely possible to keep constant the distance between the members. In addition, when members having varying configurations are hung, they are arranged at more unequal intervals.

For the same purpose, in the prior art, aluminum bars or members are connected to a holding frame by means of aluminum wires or bolts and nuts. Consequently, the number of the bars to be hung from one holding frame is limited to a small number and locations on the holding frame to secure the members are restricted at determined positions in the frame so that the number of the members to be treated is small and in addition the operation for securing the members to the frame is so complicated that it cannot be mechanized for saving human labor. Furthermore, in the case of an anodizing process followed by an electrodeposition coating process, part of the electrolyte used in the anodizing process often remains in the holding frame; this electrolyte can be carried over to the following coating process so that the coating material used in the coating process may gel to produce a gelation which will adhere to the aluminum members. The result is rejected articles and a lower yield rate. In addition, a residual electrolyte on the holding member must be removed in a cleaning process.

In prior art, moreover, frame members are arranged on a number of transfer trucks, and these trucks are pushed by a pusher conveyor to a treatment station. However, when trucks are stopped at a position, the frontmost truck will continue to travel owing to its own inertia. Members supported thereon can be dropped if each truck does not stop. The distance between trucks increases so that the members supported on a truck are not arranged at uniform intervals.

SUMMARY OF THE INVENTION

The invention is intended to overcome the above disadvantages in the prior art and for this purpose apparatus according to the invention comprises a plurality of distance members arranged parallel with each other, at least part of said distance members comprising of a pair of distance units adapted to move toward and away from each other such that when a pair of distance member units move towards and away from each other, distances between the distance units and adjacent distance units thereto widen and narrow correspondingly.

One aspect of the invention provides an apparatus for arranging materials at uniform intervals comprising a plate-like jig having a thickness somewhat thicker than the width of a slot formed in the end of frame members; this jig is adapted to be driven or forced into the slot to hold the members.

In another aspect, the invention provides an apparatus for arranging materials at uniform intervals wherein the distance bar comprises truck units having respective vertical plates pivotally connected to each other and adapted to receive frame members between a vertical plate of one truck unit and a vertical plate of a truck unit of an adjacent distance bar. The vertical plates are adapted to move toward and away from each other when the joined portions of the vertical plates are moved vertically by a lifting means. The truck units are supported at opposite ends of the joined ends by respective wheels. Each truck unit is provided with a jaw for engaging a distance bar distributing means.

Another aspect of this invention provides an apparatus for arranging materials at uniform intervals. A distance bar distributing means has spacing blocks and means for arranging said spacing blocks in a gathered condition under gathered distance bars. The blocks are caused to engage the respective distance bars. As the blocks are moved forward the distance between the blocks increases to a determined length. The distance bars are distributed at an interval for receiving frame members therebetween.

In one aspect the invention provides an apparatus for arranging materials at uniform intervals comprising a plate-like jig having a thickness somewhat thicker than a width of slots formed in frame members and adapted to be driven or struck into the slots to hold the members.

In another aspect, the invention provides an apparatus for arranging materials at uniform intervals wherein said distance bar consists of truck units having respective vertical plates articulated to each other adapted to receive frame members between a vertical plate of the truck unit and a vertical plate of a truck unit of an adjacent distance bar and adapted to move toward and away from each other by vertical movement of the articulated portion of the vertical plates by means of lifting means, said truck units being supported at opposite ends of the articulated ends by respective wheels and said any one of said truck units being provided with jaw for engaging distance bar distributing means.

In further aspect, the invention provides an apparatus for arranging materials at uniform intervals wherein comprises distance bar distributing means having spacing blocks including means for arranging said spacing blocks in gathered condition under gathered distance bars, causing said blocks to engage said respective distance bars, and thereafter causing said blocks to move away from each other whereby the distance bars are distributed at an interval for receiving frame members therebetween.

Another aspect of the invention provides an apparatus for arranging material in uniform intervals. Means are provided for pulling forward the arranged distance bars containing frame members as the members are being transferred to a surface treatment station. The pulling means comprises a pulling pawl pivotally connected to a rod-like truck reciprocatively movable. The pawl is adapted to be forced down when it travels in a reverse direction to pass below the distance bars. Once beyond the distance bars, the pawl returns to an upright condition and engages the distance bars to pull them forward. When the forward most distance bar comes into contact with a pawl on one of two proceeding or downstream chain conveyors, the conveyor is activated to move in a forward direction so that the distance bars can be further transferred while in contact with the first pawl. After travelling a determined distance, a second downstream conveyor is activated such that an attached pawl engages the rearmost distance bar. The first conveyor then is again activated and the distance bars with their frame members are transferred between the two pawls to a surface treatment station.

An object of the invention is to provide an improved apparatus for arranging material, such as frame members, at uniform intervals. The apparatus comprises a pair of distance bar units adapted to move toward and away from each other to receive the materials between the distance units and adjacent distance units. In this manner, damage to the surface of the material when the material is inserted into or removed from the distance units is avoided and further deformation to the material is avoided when the jig is forced into slots formed in the ends of the members.

Another object of the invention is to provide an improved apparatus for arranging materials, such as frame members at uniform intervals, comprising a plate-like jig adapted to be forced into slots formed in the ends of the frame members when the members are arranged at uniform intervals on distance members whereby it is simple to secure the frame members to an electrolytic frame. The number of frame members to be treated and hence the capacity of the plant is thereby increased.

A further object of the invention is to provide an improved apparatus for arranging materials at uniform intervals comprising distance bar distributing means which arranges a determined number of distance members at uniform intervals and drives the distance bars for receiving the frame members, and a pulling means which drives the distance members at uniform intervals embraced between a forward and rear pawl connected to a proceeding or downstream conveyor respectively whereby the process is automated.

Other and further objects, features and advantages of the invention will appear more fully from the following description.

BRIEF DESCRIPTION OF THE DRAWINGS

FIG. 2 is a plan view of one embodiment of the invention;

FIG. 3 is a front elevation of the apparatus shown in FIG. 2;

FIG. 6 shows frame members hung from a plate-like jig according to the invention;

FIG. 7 is a side view of the frame member and the jig in FIG. 6;

FIG. 8 shows frame members horizontally supported;

FIG. 9 is a perspective view of one end of the frame member shown in FIG. 6 which is formed with a slot for the jig;

FIG. 17 is an enlarged sectional view taken along the line XVII—XVII in FIG. 16;

FIG. 18 is an enlarged sectional view of a spacing block;

FIG. 19 shows an other embodiment of the spacing block;

FIG. 20 shows further embodiment of the spacing block;

FIG. 22 shows a pulling pawl used in the pulling means shown in FIG. 21;

FIG. 23 shows a perspective view of a transfer conveyor comprising two chain conveyors having a side-by-side relationship used with the pulling means shown in FIG. 21; and FIG. 24 shows another embodiment of the distance bar according to the invention.

DESCRIPTION OF THE PREFERRED EMBODIMENTS

Figure 1:
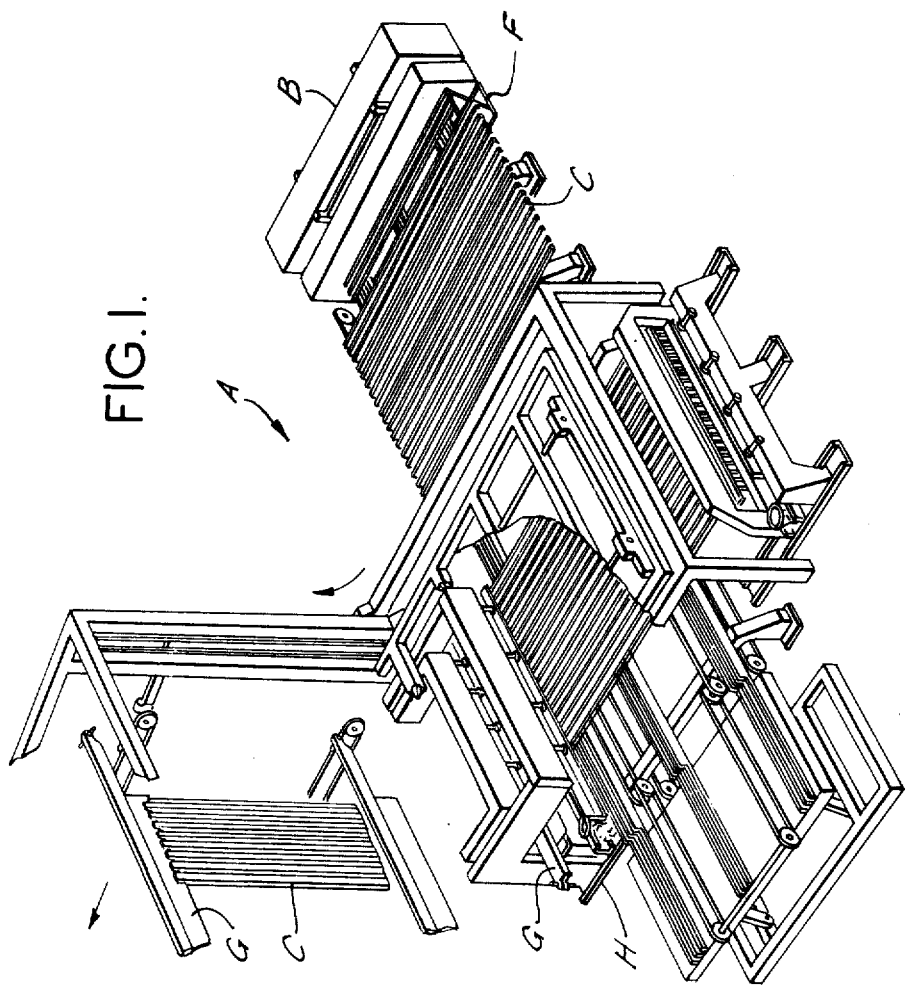
FIG. 1 is a perspective view of a racking apparatus incorporating wherein an apparatus according to the invention.

Referring to FIG. 1, the reference character A designates an automatic racking apparatus incorporating therein an apparatus according to the invention, the racking apparatus being used to suspend a number of bars or frame members of windows made of aluminum spaced apart a determined distance to each other for the purpose of feeding thus arranged members to following treatment processes such as anodic treatment (alumite), coloring or coating. The racking apparatus is adapted to receive storage pallets B for bars or frame members C as shown in FIG. 1 and arrange distance bars E on distance bar traveling rails by means of a distance bar lifter F. The frame members C are disposed on the distance bars so as to be arranged at determined intervals thereon in a manner embodying the principle of the invention as described in greater detail hereinafter and then moved together with the distance bars E to the mid-portion of the racking apparatus where a jig G is forced into slots formed in the frame members by the use of jig striking means H and an aluminum wire is pressed into the other ends of the frame members if desired. The ends of the frame members held by the jig G are raised until the members will assume a vertical position; the members are then ready to be fed to the next treatment process.

Referring now to FIGS. 2 and 3 showing a preferred embodiment of the invention, on a floor is rigidly arranged a frame 1 on which is securely supported guide rails 2 having an H-shaped cross-section. A number of distance bars 3 having a determined width are supported on the guide rails 2 slidably therealong and in parallel with each other.

The distance bar 3 is preferably made of a pair of bar units 4, 4' having an L-shaped cross-section and is provided with horizontal bottom plates 5, 5' (FIG. 4) which may be dispensed with as the case may be. Supporting blocks 6, 6' are respectively fixed to the bar units 4, 4' below the bottom plates 5, 5' and are provided with a guide shaft 7 slidably passing therethrough in a direction perpendicular to the longitudinal direction of the bar units 4, 4'. The guide shaft 7 is provided at its opposite ends with stop rings 8 so that the bar units 4, 4' are held spaced apart to each other with a clearance $d$ against a force of a compression spring 9 coiled about the guide shaft 9. The bar units 4, 4' are further provided on their front and rear faces with protecting plates 28 coated thereon of hard rubber, synthetic resin or the like.

From the lower surfaces of the supporting blocks 6, 6' extend legs 10, 10' (FIGS. 4 and 5) provided at their lower ends with rollers 11, 11' adapted to roll on the guide rails 2 and serve to slidably move the bar units 4, 4' along the guide rails.

Figure 4:
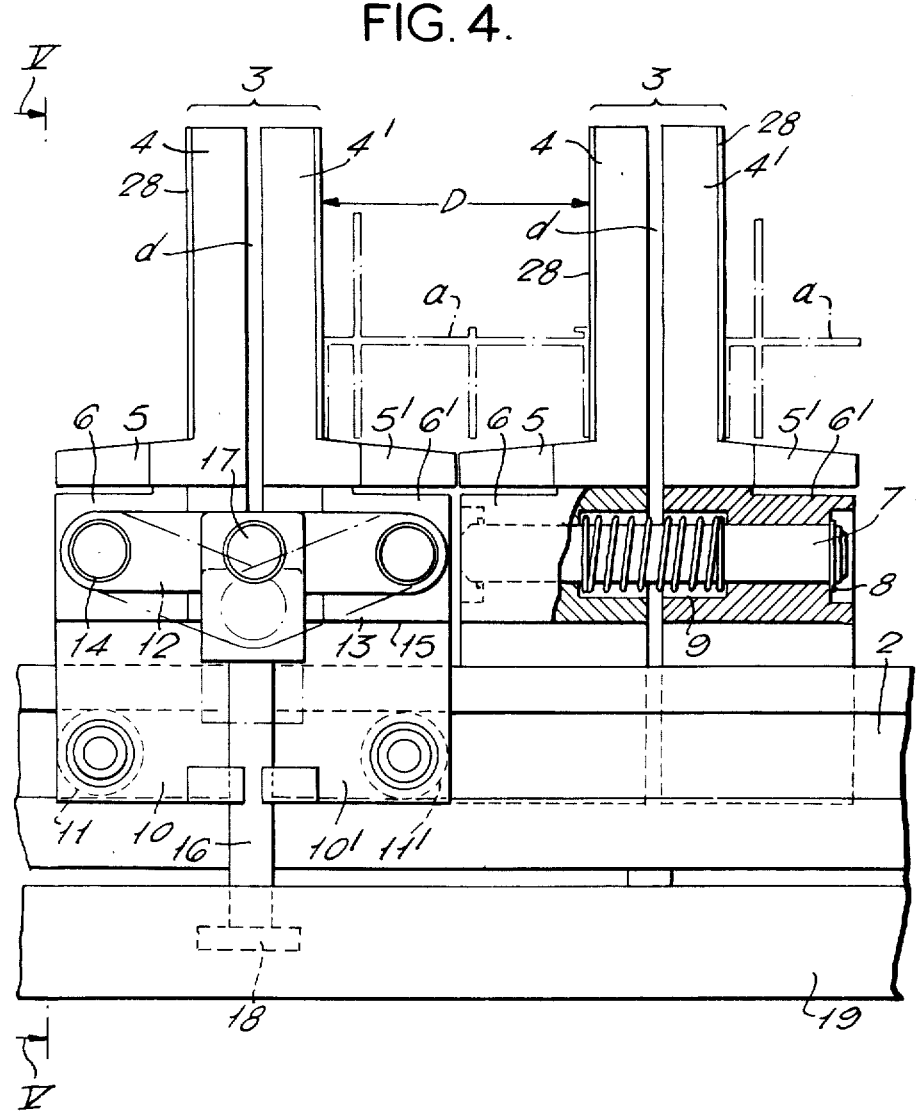
FIG. 4 is a pair of distance bars, partly in section, according to the invention.

In FIG. 4, means for moving the pair of bar units 4, 4' toward and away from each other comprises links 12, 13 of which ends are pivotally connected to the end surfaces of the blocks 6, 6' by means of pins 14, 15 and of which other ends are pivotally connected to each other and to the upper end of an operating rod 16 having at its lower end a flange 18, the links 12, 13 and operating rod 16 forming a toggle link.

It should be noted that on the other side of the bar units 4, 4' there are also provided with supporting blocks 6, 6', a guide shaft 7, rolls 11, 11' adapted to roll on the guide rails 2 and means for moving the pair of bar units 4, 4' toward and away from each other which forms a toggle link having an operating rod 16 with a flange 18 similar to those above described. The flanges 18 of the operating rods 16 are adapted to engage respective pull bars 19, 19' having a C-shaped cross-section.

Figure 5:
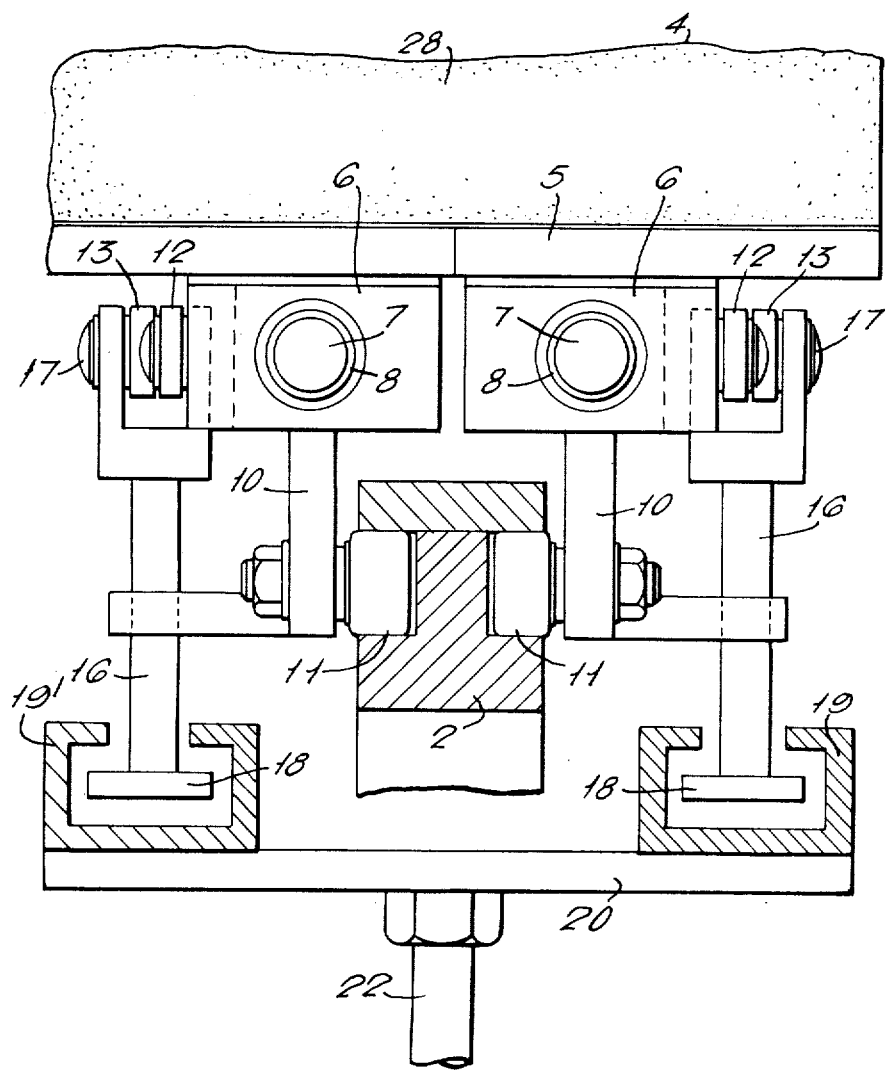
FIG. 5 is a sectional view taken along the line V—V in FIG. 4.

Other distance bars 3 are the same in construction as that above described in detail. As shown in FIGS. 4 and 5, however, the distance bars 3 are alternately arranged relative to the guide rails so that the supporting blocks 6, 6' are on one side of the guide rail 2 and the adjacent supporting blocks 6, 6' are on the other side of the guide rail 2 with which the roller 11, 11' are engaged. The flanges 18 of the operating bars of the alternative distance bars 3 are adapted to engage the pull bars 19, 19', respectively.

Referring to FIG. 5, the pull bars 19, 19' are fixed to a supporting plate 20 vertically movably supported as on a piston rod 22 of one of pneumatic cylinders 21 arranged on the floor F. In the embodiment, although the pull bars 19, 19' are arranged one on both sides of the guide rail 2, only one of them may be on one side of the rail.

In the preferred embodiment, the distance bars 3 are so constructed that the distance D therebetween are changed according to sizes or widths of bars or members to be arranged. For the purpose, the edge of each bottom plate facing to the bottom plate of the adjacent distance bar is formed with a number of rectangular notches 23 and a number of rectangular protrusions 23' therebetween such that the notches 23 of one bottom plate are adapted to accommodate the protrusions 23' of the adjacent bottom plate. The thus fitting of these notches and protrusions of the adjacent bottom plates ensures that the distance D between the distance bars 3 can be reduced to less than the combined width of the bottom plates.

At the rear or upstream and front or downstream ends of the guide rails are arranged pneumatic cylinders 24, 25 having piston rods 26, 27 of which outer ends are respectively in opposition to the distance bars positioned at the rear and front ends of the rails. Stoppers 29 are provided at the frontmost end of the guide rails.

The operation of the apparatus will be explained hereinafter. In the position shown in FIGS. 2 and 3 in which the distance bars 3 are gathered together to the rear or upsteam end as shown on the right hand side of the drawings, the pneumatic cylinders 21 are operated to lower the pull bars 19, 19' arranged on the upsteam side and hence the operating rods 16, causing the bar units 4, 4' to abut against to each other with the aid of the links 12, 13 against the force of the spring 9 to widen the distance D to D+$d$ between the adjacent distance bars. Then, each the frame members A is inserted between the bar unit 4 and the bar unit 4' of the adjacent distance bar which are spaced apart at the distance D+$d$. The pneumatic cylinders 21 are again operated to raise the operating rods 16 so that the bars units 4, 4' of respective distance bars are returned to their normal spacing, clearance $d$. The frame members A are clamped between the inside bar units of two adjacent distance bars 3 at a determined interval.

After the frame members have been thus arranged at the determined interval on the distance bars, the rearmost distance bar is pushed forward by the piston rod 27 of the pneumatic cylinder 25 so that all the distance bars 3 are pushed forward in unison along the guide rails 2 together with the frame members arranged between the distance bars at the determined interval.

The distance bars will stop when the frontmost distance bar strikes the stoppers 29 at the front end of the guide rails. In this position, a plate-like jig 51 is driven in or forced into slots formed in the ends of the frame members A without causing any deformation of the members because they are securely embraced between the distance bars. After the jig has been forced into slots in the members, front pull bars 19, 19' are lowered by operation of the pneumatic cylinders 21 so that the bar units 4, 4' abut against each other with the aid of the links 12, 13 to widen the distance D between the bar units 4, 4' the adjacent distance bars, permitting the frame members embraced between the distance bars 3 to release therefrom. Then the jig is raised by a suitable means to remove the frame members from the distance bars 3, so that the members assume a vertical position spaced to each other at the determined interval as shown in FIG. 1 to be ready to be fed to a surface treatment process such as anodic treatment (alumite), coloring or coating. The thus arranged frame members are immersed into a treatment bath of the process while being kept at the determined interval.

After the bar units 4, 4' of respective distance bars 3 have been returned to their normal spaced positions by the operation of the pneumatic cylinders 21, these distance bars 3 are returned to the initial rear or loading in on the guide rails by the operation of the pneumatic cylinder 24 of which piston rod 26 pushing backward the frontmost distance bar in the direction opposite to the previous forward direction.

In FIGS. 6 and 7, there is illustrated a preferred embodiment of the plate-like jig 51 which is formed on its side surfaces with cross scores 52 or knurled for preventing removal of the frame members therefrom and has a thickness somewhat thicker than a width of slots 54 formed in the frame members 53 (FIG. 9). The jig 51 is driven or forced into the slots 54 of the members 53 held between the distance bars so that the jig can hold the members 53 at any longitudinal locations of the members. The jig 51 is of course made of a rigid and conductive material, such as titanium alloy so as to be able to supply electric current through the jig after these members have been immersed in an electrolytic cell.

As an alternative, the members may be held horizontally with the aid of a supplemental member 55 as shown in FIG. 8. In the case, the supplemental member 55 may be made in the same configuration as that of the jig 51 for securely held the frame members 53.

Figure 10:
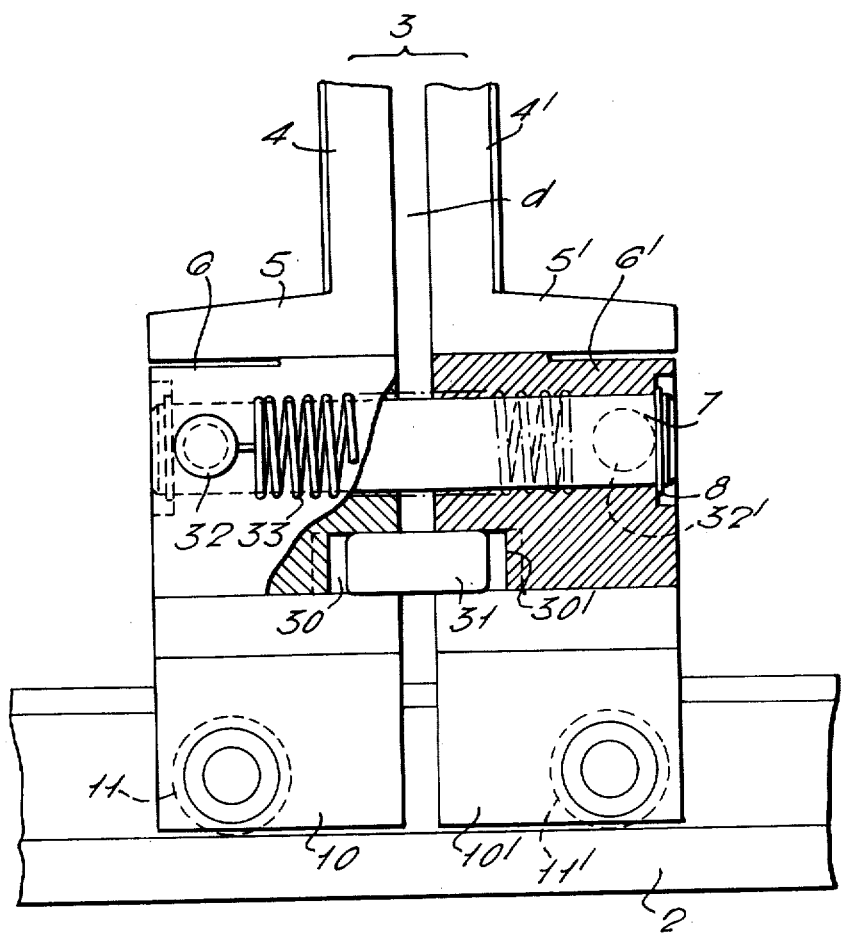
FIG. 10 shows other embodiment of the distance bar, partly in section, according to the invention.

In FIG. 10, there is illustrated other embodiment of means for moving the pair of bar units 4, 4' toward and away from each other, wherein supporting blocks 6, 6' are formed in their lower ends with half cam surfaces 30, 30' in opposition to each other to form a cam groove extending in a longitudinal direction of the distance bar and tapering in a horizontal plane and a cam member 31 in the form of a wedge tapering to meet the cam groove of the blocks 6, 6' is inserted in the cam groove. The cam member 31 is moved in the longitudinal direction of the distance bar to cause the bar units 4, 4' to move toward or away from each other. Instead of the compression spring 9 in FIG. 4, there is provided with a tension spring 33 of which ends are held at supporting pins 32, 32' provided in the proximity of the outer ends of the supporting blocks. Other arrangement and configuration are substantially similar to those of the embodiment shown in FIGS. 4 and 5.

Figure 11:
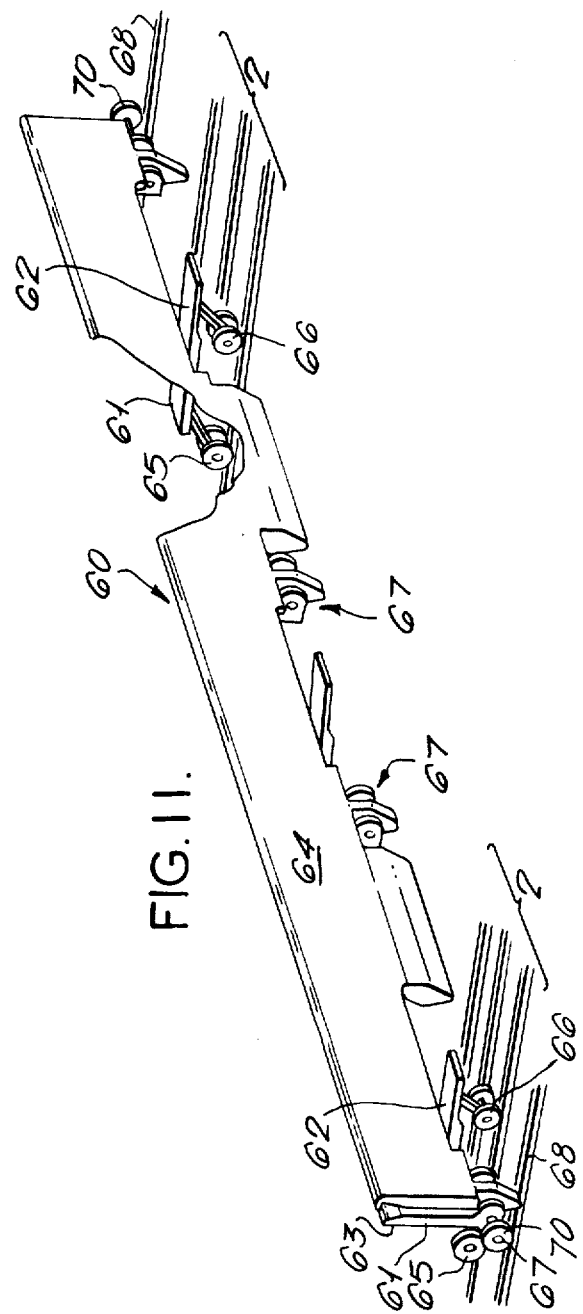
FIG. 11 is a perspective view of the further embodiment of the distance bar, partly broken away, according to the invention.
Figure 12:
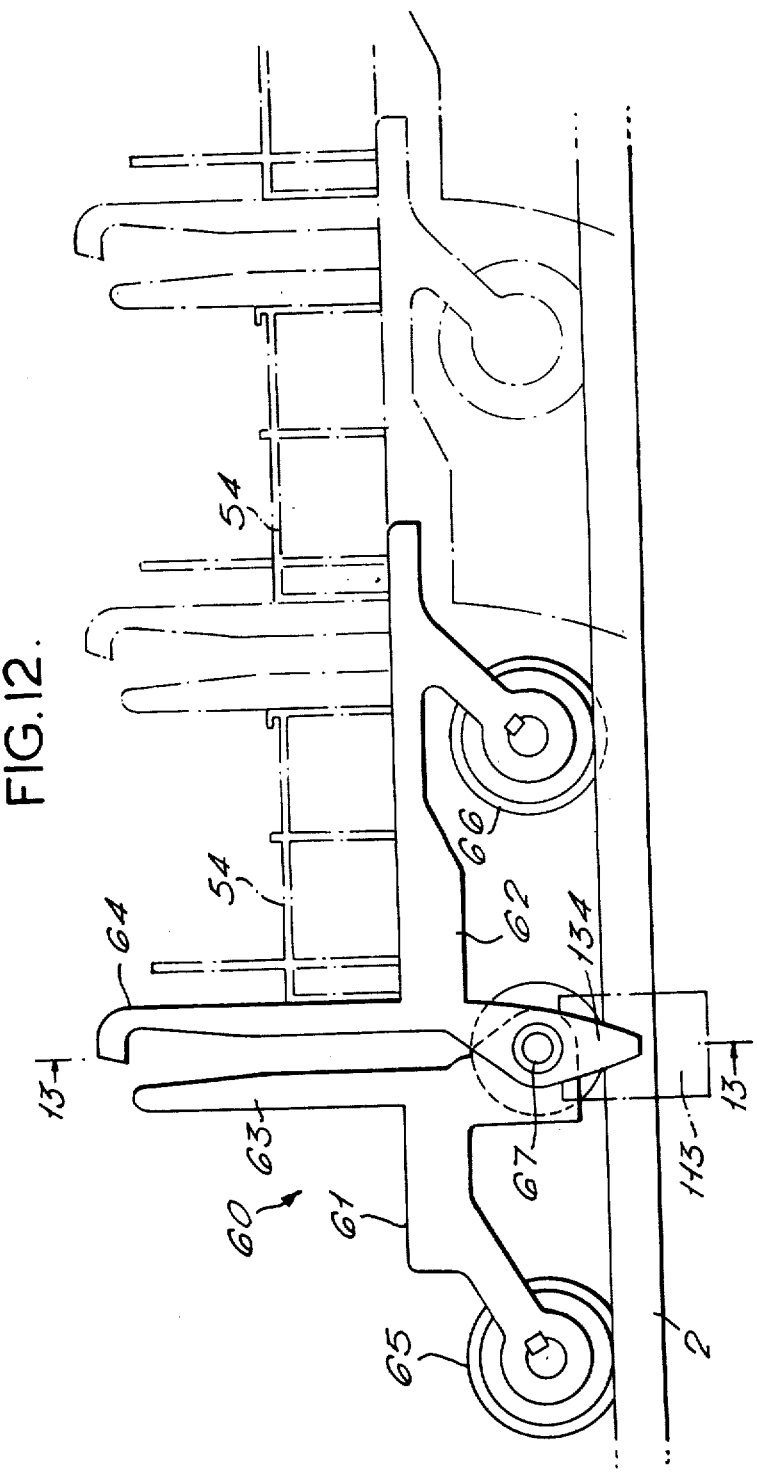
FIG. 12 is a front elevation showing the distance bar with adjacent bars in phantom lines shown in FIG. 11.
Figure 13:
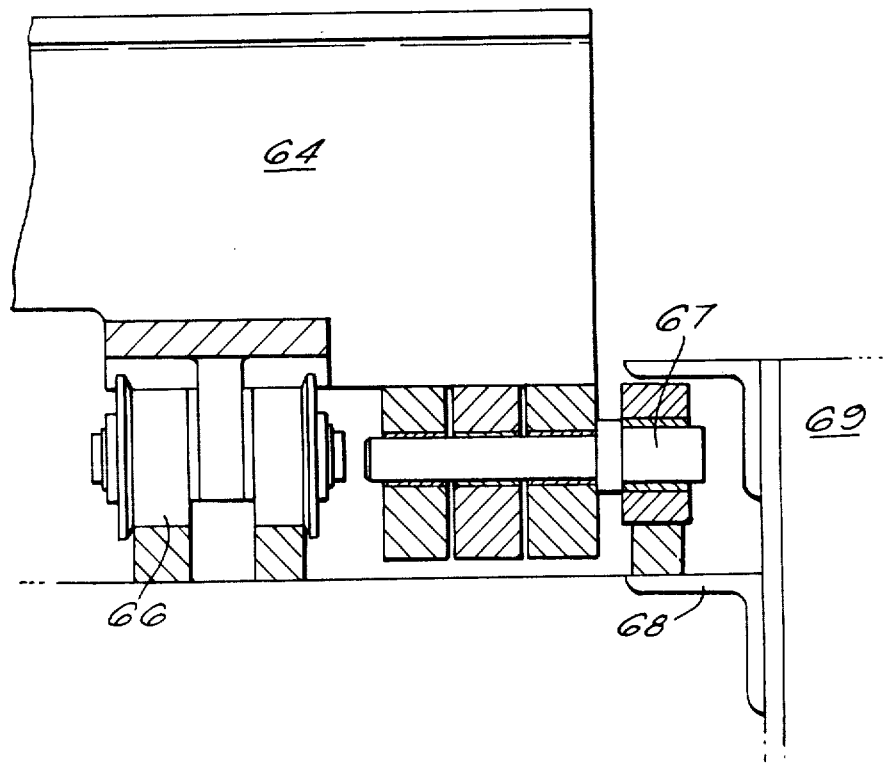
FIG. 13 shows a part of the distance bar for moving the bar units toward and away from each other.

In FIG. 11, a further embodiment of a distance bar according to the present invention is shown in a perspective view. The distance bar 60 comprises truck units or bar units 61, 62, adapted to receive a frame member to be arranged shown in phantom lines in FIG. 12 between a vertical plate 64 of the truck unit 62 and a vertical plate 63 of a truck unit of an adjacent distance bar 60 (FIG. 12). The truck unit 61 is supported at its one side by wheels 65 and the truck unit 62 at its one side by wheels 66 movable on guide rails 2. The bar units 61, 62 are articulated at hinges 67 to each other, and the hinges at the opposite ends are supported by distance bar open and close rails 68 (FIG. 13) adapted to move vertically by means of lifting means 69 for changing the distance between the vertical plates 63, 64. The truck unit 62 is provided at its lower end with a jaw 134 of which operation will be explained later.

Figure 14:
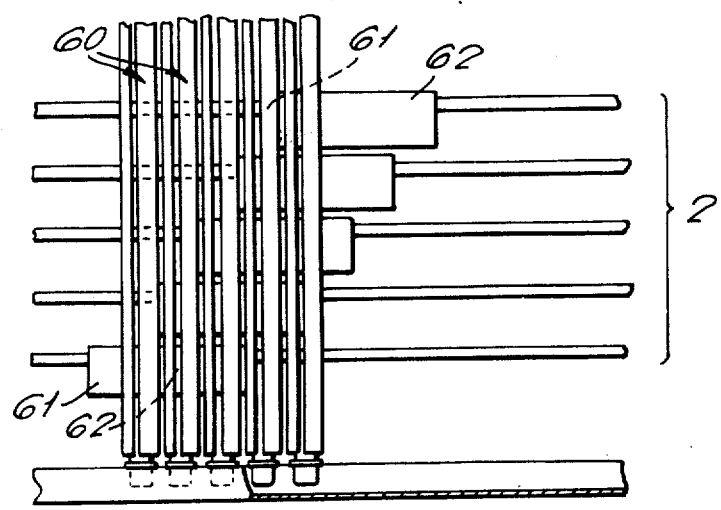
FIG. 14 is a plan view of a number of distance bars gathered with each other shown in FIG. 12.

A number of distance bars 60 having such a construction are arranged so as to travel on the rails 2 in a manner that each distance bar 60 travels on the rails 2 different from those on which the adjacent distance bar 60 travels and the truck units 61, 62 are accommodated under the vertical plates 64, 63 of the adjacent distance bars 60 as shown in FIGS. 12 and 14. Rollers 70 rotatively supported by pins 67 at the opposite ends of the distance bar 60 are supported by the distance bar open and close rails 68 of which vertical movement causes the top ends of the vertical plates 63, 64 to move toward and away from each other with the result that the distance between the vertical plate 64 of the truck unit 62 of one distance bar and the vertical plate 63 of the truck unit 61 of the adjacent distance bar increase sufficiently to insert a frame member 54 therebetween. After the frame members have been arranged between the distance bars, the lifting means is again operated to move the vertical plates 63, 64 away from each other so that the frame members 54 are securely held between the vertical plates. These distance bars 60 are then pushed from one side together with the frame members until they reach the downstream end of the guide rails as in FIGS. 2 and 3. After a jig is struck into ends of the frame members, the lifting means 69 is again operated to move the top ends of the vertical plates 63, 64 toward each other so that the distance between the vertical plate 64 of the bar unit 62 and the vertical plate 63 of the bar unit 61 of the adjacent distance bar to release from the distance bars the frame members held at their ends by the jig at a determined interval.

It will be explained in detail hereinafter how to arrange distance bars 60 at uniform intervals for receiving frame members and how to move them forward to a surface treatment station. A distance bar distributing means 107 (FIGS. 15 – 17) comprising an elongated plate-like frame 110 arranged in parallel with each other, at the inside of which are located fixed guides 111 in channel shape, which are in turn connected to a movable guide rail 112 for carrying a number of spacing blocks 113.

Referring to FIG. 17, movable guide rails 112 are formed having an inwardly facing side surface 118 to form a dovetail groove and are connected at their rear ends (the left ends as viewed in the drawing) to a slide plate 114 having on its underside wheels 115 (four wheels in FIG. 16) rollingly engaging the fixed guide rails 111. The slide plate 114 is provided on its both sides with supplementary rails 116 fixed thereto for rollingly supporting wheels 117 mounted on the outer sides of the fixed guide rails 111.

The spacing block 113 in the form of a rectangular parallelopiped is formed on its upper surface with a V-shaped engaging groove 119 and at the bottoms of both sides with dovetail slide surfaces 120 in a direction at right angles to that of the engaging groove 119, the slide surfaces 120 being that of the engaging groove 119, the slide surfaces 120 being slidably received in the dovetail slide surfaces 118. The spacing block 113 is further provided on its underside with an extending leg 121. Legs 121 of the respective adjacent blocks 113 are connected by links 122 of a determined length.

In order to drive the movable guide rails 112 and the blocks 113, within the frames 110 in the longitudinal direction thereof is arranged a hydraulic cylinder 123 of which ram 124 is connected to one end of a connecting rod 125, the other end of which is connected to the rearmost block and the movable guide rails 122. When the hydraulic cylinder 123 is actuated to extend a piston 124 (to the right hand viewed in FIGS. 15 and 16), a connecting rod 125 causes the movable guide rails 112 with the blocks 113 to move in the same direction along the fixed rails 111.

Figure 15:
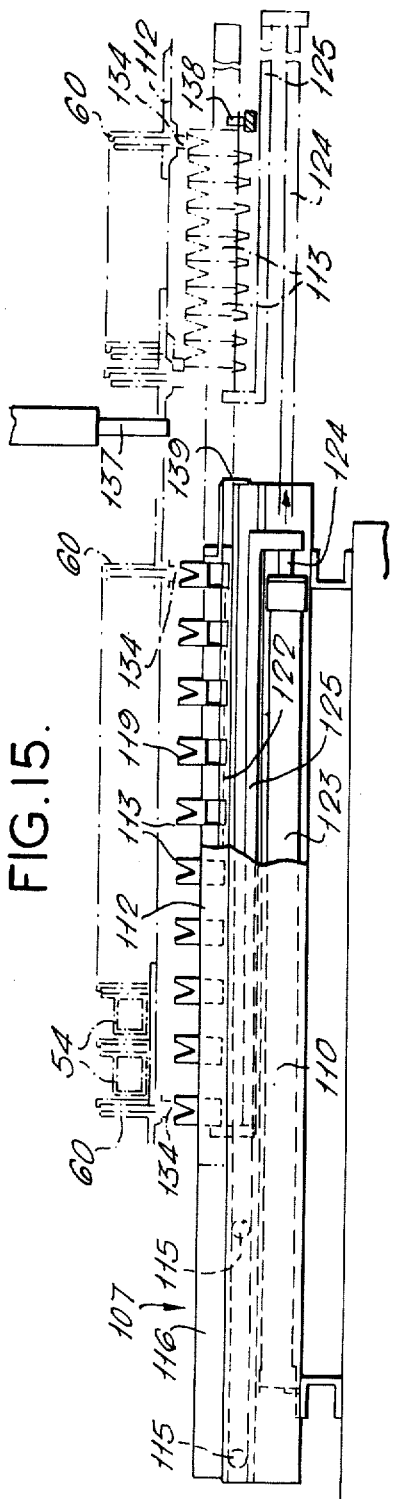
FIG. 15 is a front elevation of the distance bar distributing means according to the invention.
Figure 16:
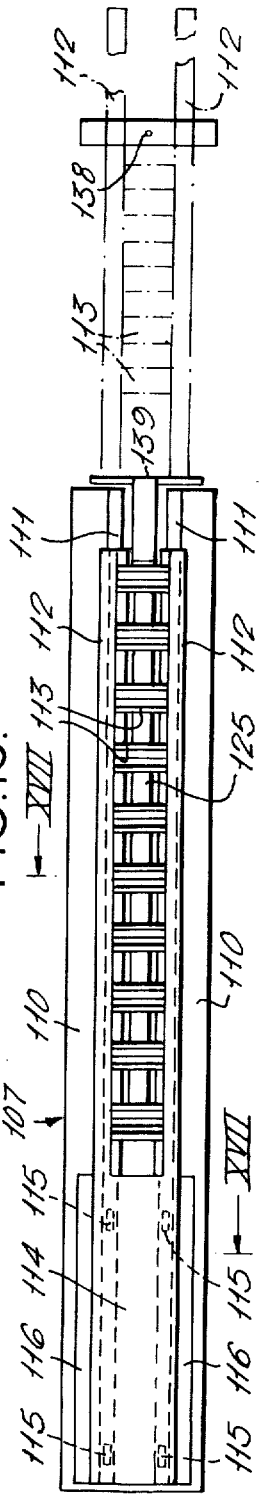
FIG. 16 is a plan view of the distributing means shown in FIG. 15.

At a rear end of a accumulation for the distance bars 60 is arranged a stop pin 137 and at a front end of the stock yard is located a stop pin 138 acting upon the spacing blocks 113 as shown in FIGS. 15 and 16.

A hook 139 is fixed to the frontmost block 113 and causes it to stop due to the engagement of the hook with the front ends of the fixed rails 111 when the blocks have retracted to the extremely left hand as viewed in FIGS. 15 and 16. The hook 139 is formed at its front end with a notch (not shown) which enables the movable rails 112 and the stop pin 138 to pass through the hook 139 during the movement of the rails 112.

Assuming that a number of distance bars 60 have been gathered together on rails (not shown) at the accumulation area with the stop pin 137 preventing the blocks 60 from their further movement, the movable rails 112 are moved into the accumulation area on the right as viewed in FIG. 15 by the operation of the hydraulic cylinder 123, causing the spacing blocks 113 to move toward the accumulation area by the pushing movement of the rearmost block until the frontmost block strikes the stop pin 138, when the blocks are gathered together with their link chains 122 loosely depending therefrom below the gathered distance bars 60.

Then, the distributing means 107 is raised by a distance by suitable means to engage the V-shaped groove 119 with the jaws 134 (FIG. 12) of the distance bars 60 (as shown in phantom lines in FIG. 15). After the stop pin 137 has been raised out of the passage of the distance bars, the movable rails 112 are moved to the left as viewed in FIGS. 15 and 16 by the operation of the hydraulic cylinder 123, causing the spacing blocks 113 respectively engaging the distance bars to move from the accumulation area to the left as viewed in the drawing by the pulling movement of the block at the left end while the respective distances between the adjacent spacing blocks are progressively increasing, so that the distance bars 60 move together with the spacing blocks 113 on the rails of the stock yard while the respective distances between the distance bars 60 are progressively increasing for receiving the frame members therebetween.

The spacing blocks 113 also can be connected to each other by means of connecting links 122a adapted to extend with the aid of springs 140 when the blocks are spaced as shown in FIG. 19. As another alternative, to front or rear faces of the spacing blocks are connected connecting rods 122b of which opposite ends with flanges are slidably received in the adjacent spacing blocks (FIG. 20). Each rod 122b may be provided with a compression spring (not shown) coiled thereabout which serves to force the adjacent spacing blocks away from each other.

Figure 21:
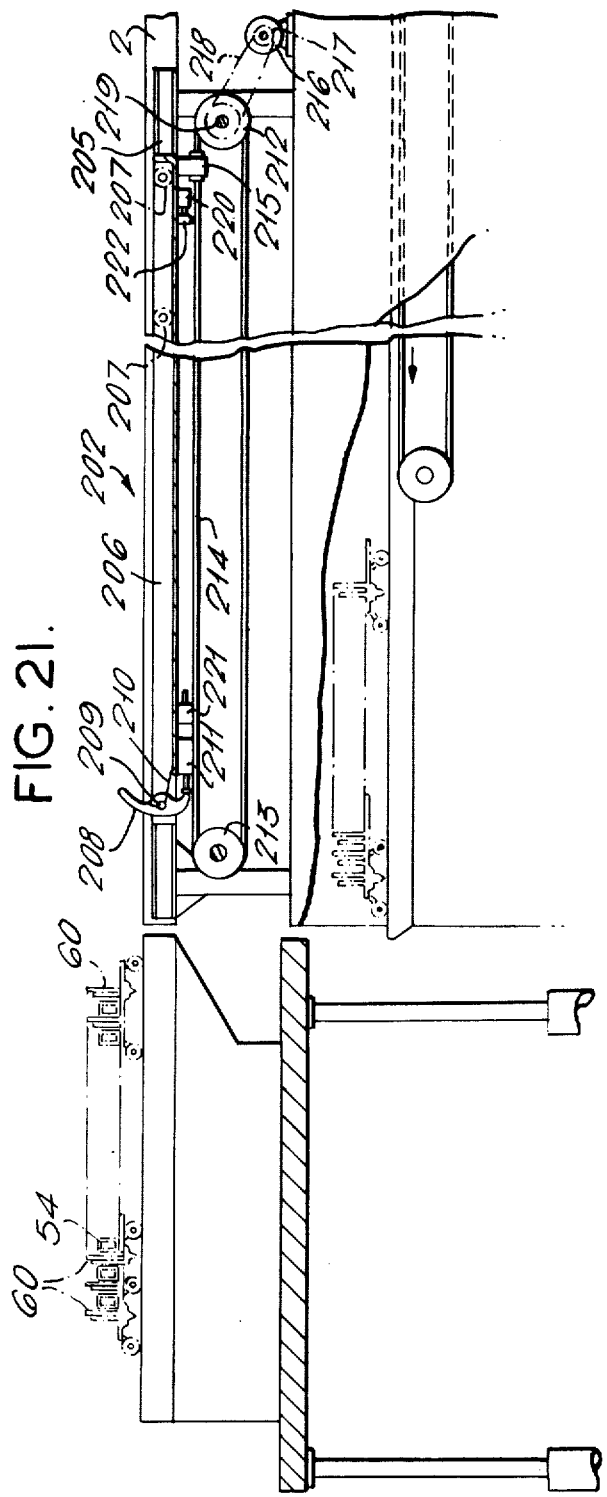
FIG. 21 is a front elevation of pushing means according to the invention.

Referring to FIG. 21, there is shown pushing means 202 for pulling forward the thus arranged distance bars 60 with frame members toward a surface treating station, wherein channel-shaped guide rails 205 are arranged in parallel with and at a level slightly lower than that of the main rails 2 for rollingly supporting wheels 207 of a rod-like truck 206 provided at its end with a pulling pawl 208 which is pivotally mounted on side walls of the truck 206 by means of a pin 209 and urged counterclockwise by an action of a wire spring 210 so that the lower end of the pawl 208 is forced against a flange of a pressure switch 211 (FIG. 22). The upper end of the pawl 208 extends beyond the main rail 2.

Referring to FIG. 22, the pressure switch 211 comprises a main body 246 and a bearing 248 slidably supporting a rod 247 which is provided at its ends with flanges and is always urged against the lower end of the pawl 208 by means of a coil spring 249 adapted to be able to overcome the force pushing a determined number of distance bars. The pressure switch is connected to a circuit for a motor of a transferring conveyor which will be explained hereinafter.

In order to drive the truck 206, below the truck is located a chain 214 which extends around chain wheels 212, 213 and is connected to the truck 206 by means of a fixture 215. The chain wheel 212 is rotatively driven by a reversible motor 216 through chain wheels 217, 219 and a chain 218. The truck 206 is provided near its front end with a dog 222 adapted to actuate limit switches 220, 221 mounted on the opposite ends of the rail 205 for stopping the motor 216.

The transferring conveyor consists of two separate, parallel but concentrically aligned chain conveyors 223 and 224 having a side-by-side relationship. Each is in parallel with and at a level lower than that of the main rail 2 and extend around a rear chain wheel 225 and 226, respectively. The chain conveyors 223, 224 are provided with pawls 227 and 228 respectively which extend above main rail 2. Conveyor 223 is rotatively driven by a motor 229 through chain wheels 231, 235 and 225 and chain 233; conveyor 224 is rotatively driven by a motor 230 through chain wheels 232, 236 and 226 and chain 234. The pawls 227 and 228 maintain a space relationship such that pawl 227 precedes pawl 228. Pressure switch 211 is connected to motor 229 for stopping and starting conveyor 223.

The chain 214 is driven counterclockwise by energizing the motor 216 in a reverse direction to drive the truck 206 to the left as viewed in FIG. 21. During the movement, the pawl 208 is rotated by the contact with the distance bars and passes below the distance bars. After the motor 216 has been stopped by the engagement of the dog 222 with the switch 221, the motor 216 is again energized in a normal direction to drive the truck 206 to the right as viewed in FIG. 21 so that the pawl 208, which now engages the rearmost distance bar, pushes the distance bars with frame members 54 in a forward direction or to the right.

Before stoppage of the truck 206, the distance bars 60 are pushed further toward the right by the pushing movement of the pawl 208 while the preceding distance bar is obstructed by the engagement of the preceding distance bar with the pawl 227 of conveyor 223, causing the lower end of the pawl 208 to press the spring 249 of the switch 211 to close the switch which energizes the motor 229 of chain conveyor 223 to drive it clockwise. Consequently, the distance bars are further driven to the right, being embraced between the preceding pawl 227 and the pulling pawl 208.

After the truck 206 has travelled a determined distance, the dog 222 of the truck 206 presses the switch 220 on the rail 205 to stop the motor 216 and hence the truck 206, permitting the pressure switch 211 to open thereby resulting in stoppage of the motor 229 and hence the conveyor 223. The distance bars 60 are stopped at this location in contact with the preceding pawl 227.

In this manner, when the distance bars 60 or a number of sets of distance bars have been stopped at a position, the motor 230 is energized to drive the conveyor 224 clockwise and when the trailing pawl 228 engages the rearmost distance bar the conveyor 223 is driven clockwise at the same velocity so that the distance bars with the frame members at uniform intervals embraced between the preceding and trailing pawls 227, 228 are driven on the main rails 2 to the surface treatment station.

It is to be understood that in order to move bar units toward and away from each other, other means can be utilized such as electromagnetic means, hydraulic piston and cylinder means and bellows or diaphragms inserted between the bar units and adapted to be replenished with fluid pressure or other various means.

Such means for moving bar units may be provided on all distance bars or on every other distance bars, in which latter case bar units of each of the every other distance bars are undetachably connected together or integrally formed together to each other.

In FIG. 24, instead of the distance bars shown in FIGS. 4 and 10, each distance bar is divided into a plurality of parts to form a distance piece 3a consisting of a pair of piece units 4a, 4a' movable along a guide rail 2a.

For the purpose of driving the distance bars, the guide rails may be made in the form of an endless drive so that the distance bars may be driven as by drive chains.

In addition, the apparatus according to the invention may be so constructed that one of a number of distance bars, for example, the frontmost or rearmost distance bar is fixed to a determined position and the distance bars other than the fixed bar are movable or one bar unit of a pair of units of each distance bar may be fixed to a determined position.

According to the invention, materials or members to be treated can be exactly arranged by simply distributing the members between the distance bars and the distance between the members to be treated can be varied by changing the distance between bar units of a distance bar, so that the insertion and removal of the members into and from between the distance bars can be easily effected.

The apparatus according to the invention can be advantageously used for arranging members at uniform interval such as aluminum alloy frame members prior to their surface treatment because the distance between the distance units is widened to avoid the damage to the surface of the members when they are inserted into or removed from the distance units and because the distance units securely hold the side surfaces of the frame members to avoid their deformation when a jig is struck into slots formed in the ends of the members.

It is further understood by those skilled in the art that the foregoing description is a preferred embodiment of the disclosed device and that various changes and modifications may be made in the invention without departing from the spirit and scope thereof.

What is claimed is:

1. An apparatus for arranging articles, materials, and the like at an equidistance between adjacent sides of said article and for transferring said articles to another location comprising:
    a. a plurality of distance members arranged in parallel rows, said rows being aligned at a right angle relative to the direction of transfer; said distance members each comprising a pair of distance units adapted to move toward and away from each other respectively, and
    b. a closing and opening means for moving said distance units toward and away from each other whereby when said distance units are moved toward and away from each other to produce a selected distance between one of the distance units and an adjacent distance units thus permitting articles to be arranged with uniform spacing even if the articles are different in dimension as measured in the direction to be transferred.

2. An apparatus according to claim 1 further characterized by said pair of distance units comprising:
    a pair of bar units (4,4') having an L shaped crosssection.

3. An apparatus according to claim 1 further characterized by said open and closing means comprising:
    a guide shaft (7) for said distancee unit (4,4'), said shaft limiting the relative movement between respective bar units,
    a compressor spring (9) coiled about said guide shaft,
    a pair of links, each link having one end pivotally connected to the respective bar unit by means of a pin, other end of said links pivotally connected together, and
    an operating rod having an upper end connecting to the joined ends of said links to form a toggle link whereby moving said operating rod vertically causes said distance units to move horizontally toward and away from each other along said guide shaft, said spring biasing said distance unit apart.

4. An apparatus according to claim 3 and further characterized wherein said open and closing means comprising:
    a fluid driven cylinder, said cylinder operatively connected to said rod, and
    a control means to activate said cylinder,
    wherein said opening and closing means may be operated remotely by the control means.

5. An apparatus according to claim 1 and further characterized by said apparatus including a lifting means adapted to form a joint with the ends of said articles and holding said articles in a vertical position.

6. An apparatus as set forth in claim 5 wherein said lifting means comprises a plate-like jig, said jig having a thickness somewhat thicker than a width of slots formed in the end of the articles and adapted to have its side surfaces forced into the slots to form a friction joint between the sides of said jig and the sides of said slot.

7. An apparatus according to claim 6 and further characterized by said sides of said jig having cross scores to increase the friction between said jig sides and said slot sides.

8. An apparatus as set forth in claim 6 wherein said jig is made of a rigid and conductive material, such as titanium alloy.

9. An apparatus as set forth in claim 1, wherein said distance member (3) is provided at its underside with supporting blocks (6,6') which are formed in their lower ends with half cam surfaces (30,30') in opposition to each other to form a cam groove extending in a longitudinal direction of the distance bar and tapering in a horizontal plane and a cam member (31) in the form of a wedge tapering to meet the cam groove of the blocks (6,6') is inserted in said cam groove, said supporting blocks (6,6') being provided with a tension spring (33) of which ends are held at supporting pins (32,32') provided in the proximity of the outer ends of the supporting blocks (6,6') for forming said blocks toward each other.

10. An apparatus as set forth in claim 1, wherein said distance bar consists of truck units (61,62) having respective vertical plates (63,64) articulated to each other adapted to receive frame members between a vertical plate (64) of the truck unit (62) and a vertical plate (63) of a truck unit of an adjacent distance bar (60) and adapted to move toward and away from each other by vertical movement of the articulated portion of the vertical plates (63,64) by means of lifting means (69), said truck units (61,62) being supported at opposite ends of the articulated ends by respective wheels (65,66) and said any one of said truck units (61,62) being provided with jaw (134) for engaging distance bar distributing means (107).

11. An apparatus as set forth in claim 10, wherein said distance bars (60) are arranged so as to travel on the rails (2) in a manner that each distance bar (60) travels on the rails different from those on which the adjacent distance bar (60) travels and the truck units (61,62) are accommodated under the vertical plates (64,63) of the adjacent distance bars (60).

12. An apparatus as set forth in claim 10, wherein comprises distance bar distributing means (107) having spacing blocks (113) including means for arranging said spacing blocks (113) in gathered condition under gathered distance bars (60), causing said blocks (113) to engage said respective distance bars (60), and thereafter causing said blocks (113) to move away from each other whereby the distance bars (60) are distributed at an interval for receiving frame members therebetween.

13. An apparatus as set forth in claim 12, wherein said spacing blocks (113) are connected to each other by links (122) and moved by the use of hydraulic means (123).

14. An apparatus as set forth in claim 12, wherein to front and rear faces of said spacing blocks (113) are connected connecting rods (122b) of which opposite ends with flanges are slidably received in the adjacent spacing blocks, each said rod (122b) provided with a compression spring coiled thereabout which serves to force the adjacent spacing blocks away from each other.

15. An apparatus according to claim 1 and further characterized wherein said apparatus including:
a pulling means (202) for pulling forward the arranged distance bars (60) with articles secured by said distance bars to a surface treating station, said pulling means comprising a pulling pawl (208), a rod-like truck (206) reciprocatively movable, said pulling pawl pivotally connected to said truck and adapted to rotate to pass below said distance bars when said pulling pawl is moved in a reversed direction by said truck, and said pawl adapted to engage the distance bars to pull them forward when said pawl travels in a forward direction.

16. An apparatus according to claim 15 and further characterized wherein said apparatus including:
a transfer conveyor, said conveyor comprising two separate parallel chain conveyors (223,224) being located in a side-by-side relationship, said conveyors having a pawl respectively prepared for engagement with said distance bars, said pawls having a space relationship such that one pawl precedes and the other pawl trails,
wherein said plurality of distance bars are held between said pawls as said distance bars are transferred by said transfer conveyor.

17. An apparatus as set forth in claim 1, wherein each said distance member (3) is divided into a plurality of parts to form a distance piece (3a) consisting of a pair of piece units (4a,4a′) movable along a guide rail.

* * * * *